(12) United States Patent
Kuo

(10) Patent No.: US 8,550,138 B2
(45) Date of Patent: Oct. 8, 2013

(54) APPARATUS FOR MAKING A FILTERING UNIT

(75) Inventor: Chi-Chang Kuo, Taichung (TW)

(73) Assignee: New Century Membrane Technology Co., Ltd., Taichung (TW)

( * ) Notice: Subject to any disclaimer, the term of this patent is extended or adjusted under 35 U.S.C. 154(b) by 0 days.

(21) Appl. No.: 13/551,333

(22) Filed: Jul. 17, 2012

(65) Prior Publication Data

US 2012/0279663 A1    Nov. 8, 2012

Related U.S. Application Data

(62) Division of application No. 12/820,256, filed on Jun. 22, 2010, now Pat. No. 8,440,033.

(51) Int. Cl.
*B32B 37/00*    (2006.01)
(52) U.S. Cl.
USPC ........... 156/515; 156/530; 156/553; 156/555; 156/580.2; 156/582

(58) Field of Classification Search
USPC ................ 156/73.1, 251, 267, 269, 510, 515, 156/530, 553, 555, 580, 580.1, 580.2, 582, 156/583.1
See application file for complete search history.

(56) References Cited

U.S. PATENT DOCUMENTS 2,235,624 A * 3/1941 Schwartz ........................ 55/476
4,690,722 A * 9/1987 Flood ............................ 156/510
4,715,955 A * 12/1987 Friedman ...................... 210/346

* cited by examiner

*Primary Examiner* — James Sells

(57) ABSTRACT

An apparatus for making a disk-shaped filtering unit includes a conveying unit, a hot-pressing unit and a punching unit. The conveying unit conveys a laminate including a screen-related substrate sandwiched between two membrane-related substrates. The hot-pressing unit hot-presses and welds the laminate dot by dot to bond the substrates along a closed curve eventually, thus making a semi-product of the filtering unit out of a portion of the laminate within the closed curve. The punching unit punches the semi-product with an aperture, thus making a final product of the filtering unit.

8 Claims, 5 Drawing Sheets

APPARATUS FOR MAKING A FILTERING UNIT

CROSS-REFERENCE

The present application is a divisional application of application Ser. No. 12/820,256 filed on 22 Jun. 2010, now U.S. Pat. No. 8,440,033 and the entire disclosure of application Ser. No. 12/820,256 is incorporated herein.

BACKGROUND OF INVENTION

1. Field of Invention

The present invention relates to a filtering unit and, more particularly, to an apparatus for making a filtering unit.

2. Related Prior Art

As disclosed in U.S. Pat. No. 7,575,678 issued to the applicant of the present applicant, a portable water purification device includes a base, a fixed sleeve, a tube, a filtering unit, and a movable sleeve. The base includes a channel for providing filtered liquid. The fixed sleeve is fixed on the base and includes a first peripheral wall and a first axial hole. The tube, on which the filtering unit is mounted, is secured on the base and held in the first axial hole to define an aperture in communication with the channel. The movable sleeve is mounted on an external surface of the fixed sleeve, and slid between a first position away from the base and a second position adjacent to the base. The movable sleeve includes a second peripheral wall and a second axial hole whereby the first axial hole communicates with the second axial hole to define a containing room when the movable sleeve is in the first position.

In the U.S. Patent, the filtering unit includes a screen sandwiched between two permeable membranes. The screen and the membranes are cut from substrates. Water-proof adhesive is provided along the edge of each of the screen and the membranes. Then, the screen and the membranes are located in a mold in which they are pressed. After the curing of the adhesive, the screen and the membranes become a laminate. Then, the laminate is punched with an aperture. Thus, the filtering unit is made. It however takes a lot of time for the adhesive to cure, and this is undesirable for massive production.

To expedite the production of the filtering unit, ultrasonic welding is used to bond the overlapped screen and membranes along the edges. Then, a knife is used to cut the bonded screen and membrane with an aperture. It is however difficult to execute the ultrasonic welding on the overlapped screen and membranes at one step where the edges are long. In general, each of the edges is divided into to three sections of marginally larger than 120 degrees, and the ultrasonic welding is executed at three steps. To make the edge well waterproof, ultrasonic welding is executed twice on a small portion of each of the edges between any two adjacent ones of the sections of each of the edges. Repeated ultrasonic welding would however cause excessive heating that would damage or deform the surface of the filtering unit. Such excessive heating would even make invisible but harmful slits in the filtering unit. Therefore, the yield is not satisfactory, and this is a heavy burden on quality control. Moreover, it requires a lot of laboring to execute the three-stepped ultrasonic welding, and this is hence inexpensive.

The present invention is therefore intended to obviate or at least alleviate the problems encountered in prior art.

SUMMARY OF INVENTION

It is the primary objective of the present invention to provide an efficient apparatus for making a reliable filtering unit at a high yield.

To achieve the primary objective, the apparatus includes a conveying unit, a hot-pressing unit and a punching unit. The conveying unit conveys a laminate including a screen-related substrate sandwiched between two membrane-related substrates. The hot-pressing unit hot-presses and welds the laminate dot by dot to bond the substrates along a closed curve eventually, thus making a semi-product of the filtering unit out of a portion of the laminate within the closed curve. The punching unit punches the semi-product with an aperture, thus making a final product of the filtering unit.

Other objectives, advantages and features of the present invention will be apparent from the following description referring to the drawings.

BRIEF DESCRIPTION OF DRAWINGS

The present invention will be described via detailed illustration of the preferred embodiment referring to the drawings, where.

DETAILED DESCRIPTION OF PREFERRED EMBODIMENT

Figure 1:
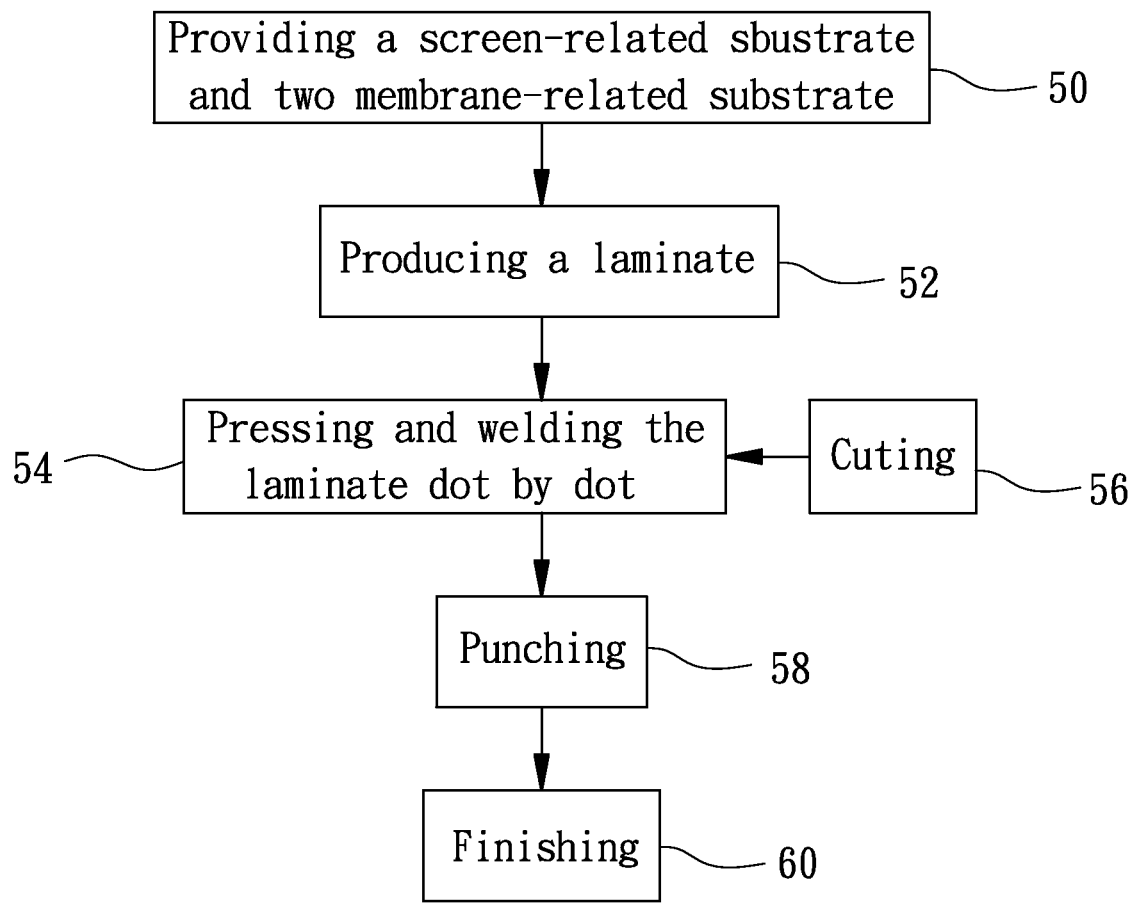
FIG. 1 is a flow chart of an efficient method for making a reliable filtering unit at a high yield according to the preferred embodiment of the present invention.
Figure 2:
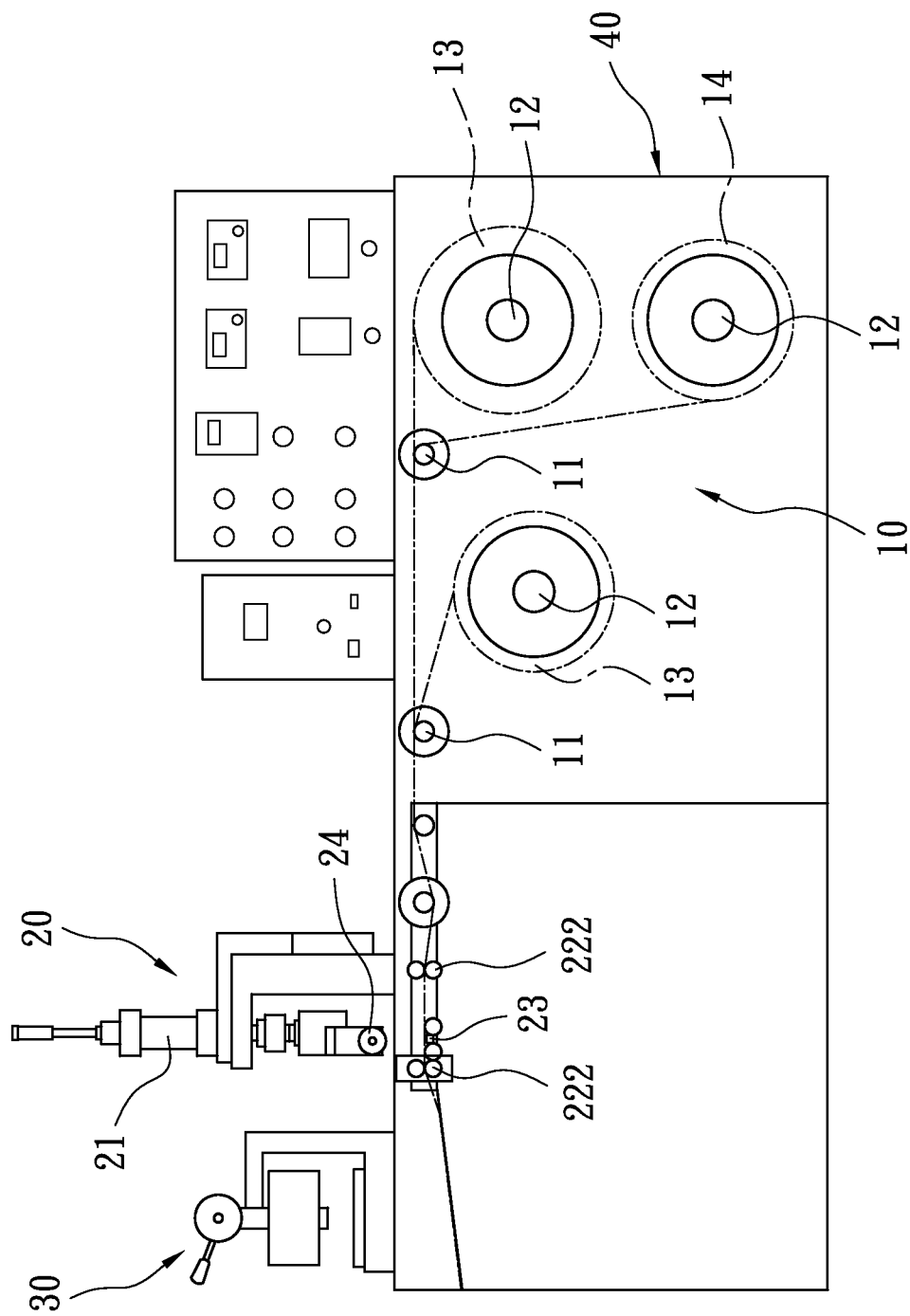
FIG. 2 is a side view of an apparatus for making a reliable filtering unit according to the method shown in FIG. 1.

Referring to FIG. 1, there is shown an efficient method for making a reliable filtering unit at a high yield according to the preferred embodiment of the present invention. Referring to FIG. 2, there is shown an apparatus for making the filtering unit according to the method shown in FIG. 1. The apparatus includes a conveying unit 10, a hot-pressing unit 20 and a punching unit 30. The units 10, 20 and 30 are arranged on a table 40.

The conveying unit 10 includes first and second conveying rollers 11 and first, second and third axles 12. The conveying rollers 11 and the axles 12 are located in proper positions on the table 40.

Figure 3:
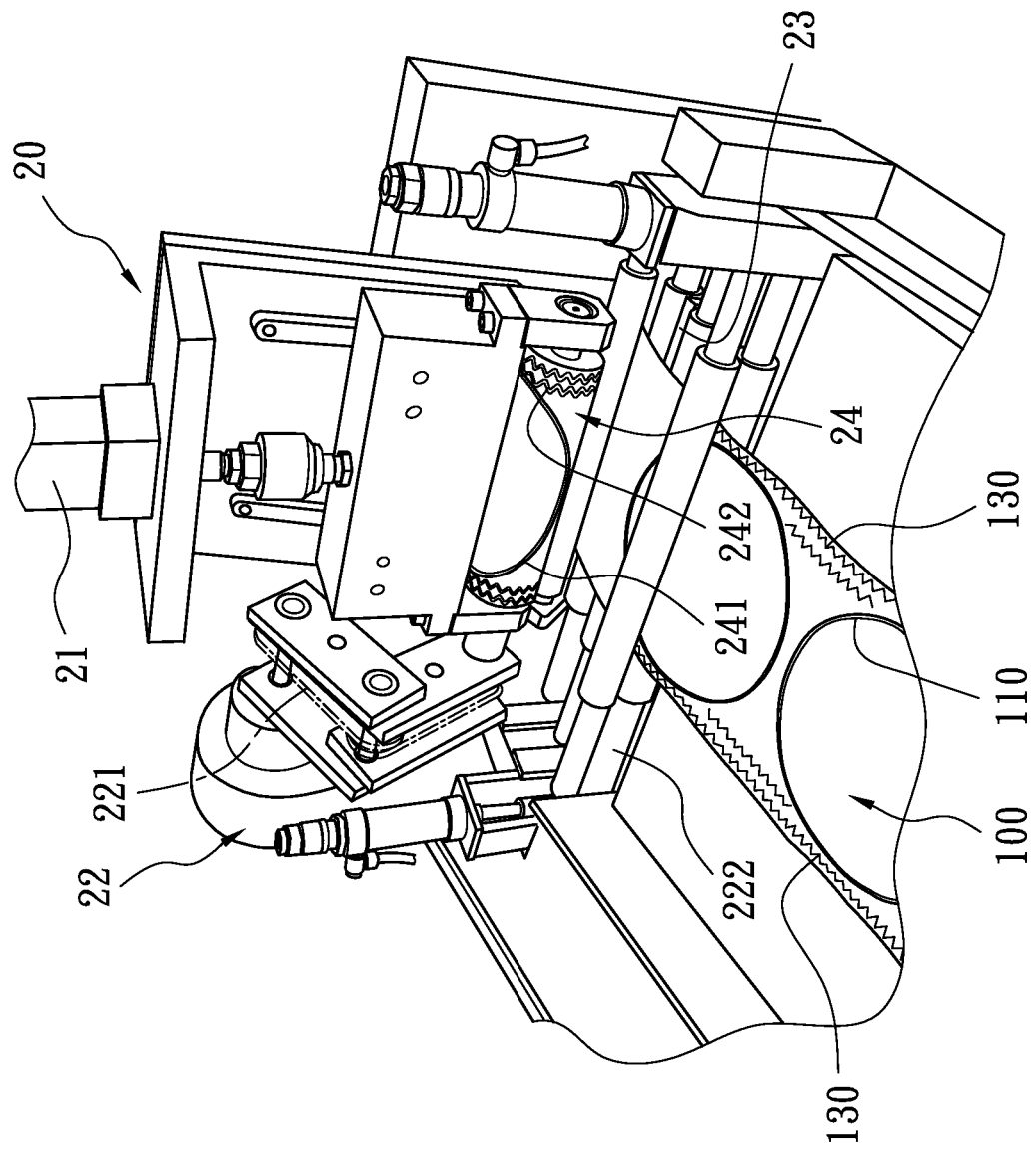
FIG. 3 is a perspective view of a hot-pressing unit of the apparatus shown in FIG. 2.

Referring to FIGS. 2 and 3, the hot-pressing unit 20 includes a pneumatic cylinder 21, a transmission 22, a heater 23 and a pressing roller 24. Transferring rollers 222 are located in proper positions on the table 40. The pneumatic cylinder 21 is located in a proper position on the table 40. The transmission 22 is used to transmit power to the pressing roller 24 from the pneumatic cylinder 21 so that the pressing roller 24 is movable toward and from the transferring rollers 222. The transmission 22 includes a chain 221 and toothed wheels. The heater 23 is operable based on ultrasonic welding or high-frequency welding.

The pressing roller 24 includes a primary pattern 241 located between two secondary patterns 242. The pattern 241 and 242 protrude from the periphery of the pressing roller 24. The primary pattern 241 is shaped corresponding to a closed curve. The secondary patterns 242 are shaped corresponding to a line.

The punching unit 30 is located in a proper position on the table 40.

According to the method, at 50, a first membrane-related substrate 13 is provided in a roll wound around a reel supported on the first axle 12. A second membrane-related substrate 13 is provided in a roll wound around a reel supported on the second axle 12. A screen-related substrate 14 is provided in a roll wound around a reel supported on the third axle 12.

At 52, a laminate is produced by sandwiching the screen-related substrate 14 between the first and second membrane-related substrates 13. In detail, the first membrane-related substrate 13 is reeled out from the reel supported on the first axle 12 and conveyed to the first conveying roller 11. The second membrane-related substrate 13 is reeled out from the reel supported on the second axle 12 and conveyed to the second conveying roller 11. The screen-related substrate 14 is reeled out from the reel supported on the third axle 12 and conveyed to the first conveying roller 11. The screen-related substrate 14 and the first membrane-related substrate 13 are overlapped on the first conveying roller 11 before they are conveyed to the second conveying roller 11. The screen-related substrate 14 is sandwiched between the first and second membrane-related substrates 13 on the second conveying roller 11. Thus, the laminate is produced. The laminate is sent to the hot-pressing unit 20 from the conveying unit 10.

At 54, the laminate is hot-pressed. In detail, the pressing roller 24 presses the laminate against some of the transferring rollers 222 while the heater 23 heats the laminate. As the pressing roller 24 rolls, the primary pattern 241 presses the laminate against the transferring rollers 222 while the secondary patterns 242 press the laminate against the transferring rollers 222. The primary pattern 241 welds the laminate dot by dot. The primary pattern 241 bonds the substrates 13 and 14 along a closed curve 110 eventually. The closed curve 110 is preferably a circuit. Thus, a portion of the laminate within the closed curve 110 is made a semi-product of the filtering unit 100. The secondary patterns 242 weld the laminate dot by dot. The secondary patterns 242 bond the substrates 13 and 14 along a closed curve 110 along two lines 130 eventually. The lines 130 are preferably zigzag lines. Therefore, the integrity of the laminate is improved during the conveying.

At 56, the semi-product can be cut from the laminate while the laminate is hot-pressed. This can be achieved by providing tiny teeth along the primary pattern 241. The tiny teeth can cut the semi-product from the laminate.

At 58, the punching unit 30 is used to punch the semi-product with an aperture 120

Figure 4:
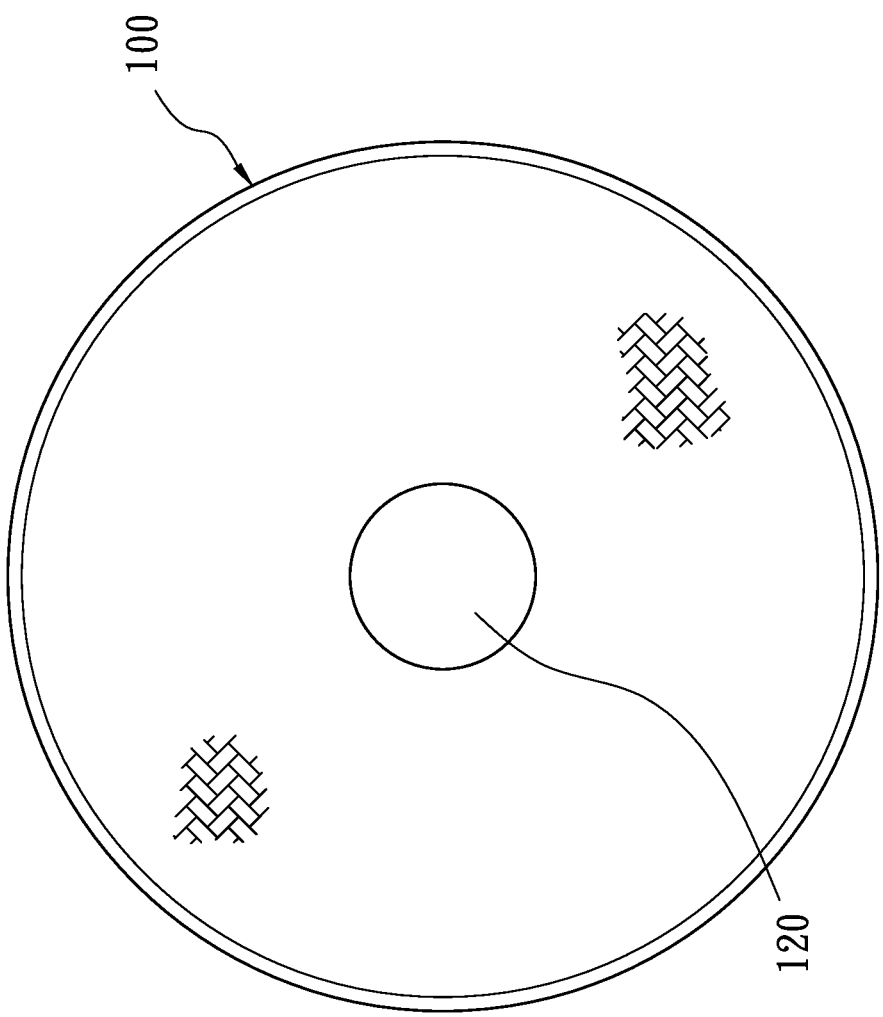
FIG. 4 is a top view of a filtering unit made with the apparatus shown in FIGS. 2 and 3 according to the method shown in FIG. 1.
Figure 5:
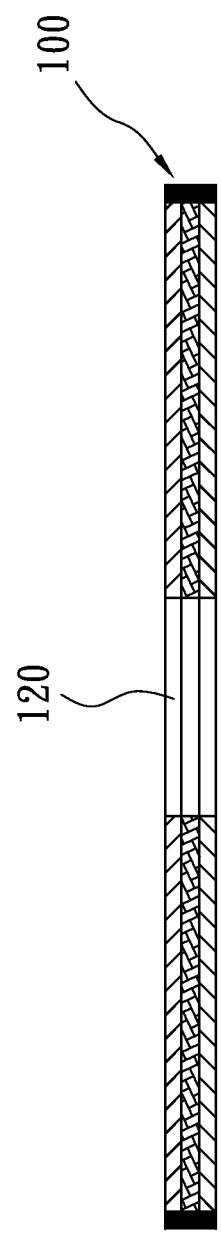
FIG. 5 is a cross-sectional view of the filtering unit shown in FIG. 4.

At 60, a final product of the filtering unit 100 is made as clearly shown in FIGS. 4 and 5.

The method and apparatus of the present invention exhibits several advantages. Firstly, the production of the filtering unit is fast and inexpensive. This is because the production of the filtering unit is automatic without requiring much laboring.

Secondly, the consumption of energy is low. This is because heat is provided to the laminate within a small area at any time, and little heat would be dissipated.

Thirdly, the resultant filtering unit is reliable. This is because the welding is executed dot by dot without repeated welding that would cause excessive heating that would damage the resultant filtering unit.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for making a disk-shaped filtering unit, the apparatus comprising:
    a conveying unit for conveying a laminate including a screen-related substrate sandwiched between two membrane-related substrates;
    a hot-pressing unit including at least one transferring roller for conveying the laminate and a pressing roller formed with a primary pattern for pressing the laminate against the transferring roller to synchronously bond the substrates and cut the laminate along a closed curve corresponding to the primary pattern, thus making a semi-product of the filtering unit out of a portion of the laminate within the closed curve; and
    a punching unit for punching the semi-product with an aperture, thus making a final product of the filtering unit.

2. The apparatus according to claim 1, wherein the pressing roller includes two secondary patterns protruding from the periphery thereof, wherein the secondary patterns press and weld the laminate against the transferring roller to bond the substrates along two lines eventually.

3. The apparatus according to claim 2, wherein each of the secondary patterns is shaped corresponding to a zigzag line.

4. The apparatus according to claim 1, wherein the hot-pressing unit includes a heater located on a side of the laminate while the pressing roller is located on an opposite side of the laminate.

5. The apparatus according to claim 4, wherein the heater is an ultrasonic heater.

6. The apparatus according to claim 1, wherein the hot-pressing unit includes a pneumatic cylinder and a transmission for transmitting power to the pressing roller from the pneumatic cylinder.

7. The apparatus according to claim 1, wherein the conveying unit includes:
    a first conveying roller for conveying the screen-related substrate and one of the screen-related substrates; and
    a second conveying roller for conveying the laminate.

8. The apparatus according to claim 7, wherein the conveying unit includes:
    a first axle for supporting one of the membrane-related substrates in a roll which is conveyed to the first conveying roller;
    a second axle for supporting the other membrane-related substrate in a roll which is conveyed to the second conveying rollers; and
    a third axle for supporting the screen-related substrate in a roll which is conveyed to the first conveying roller.

* * * * *